March 10, 1964  S. LEE  3,124,219
DISC BRAKE ASSEMBLY
Filed Jan. 3, 1961  2 Sheets-Sheet 1
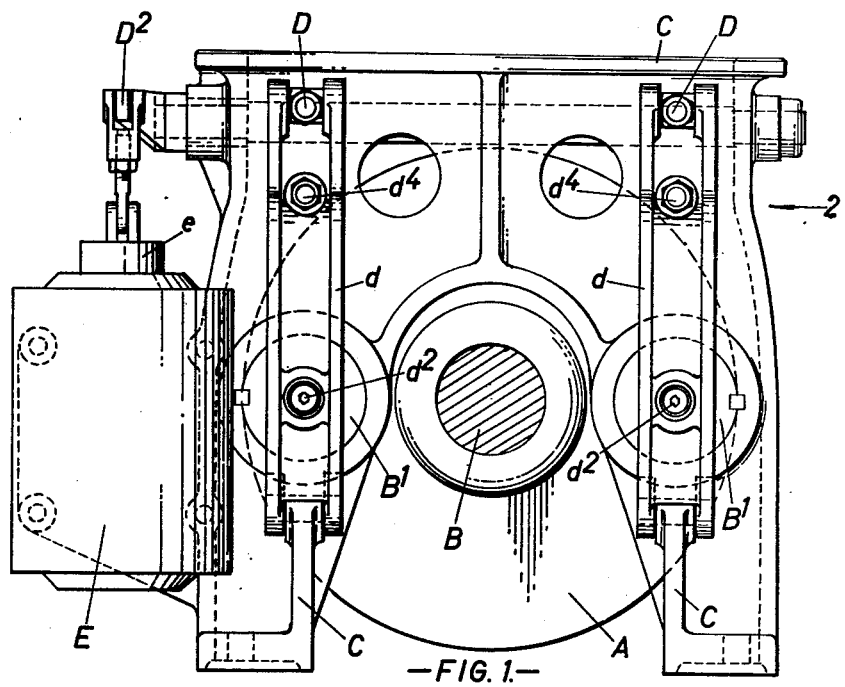
—FIG. 1.—
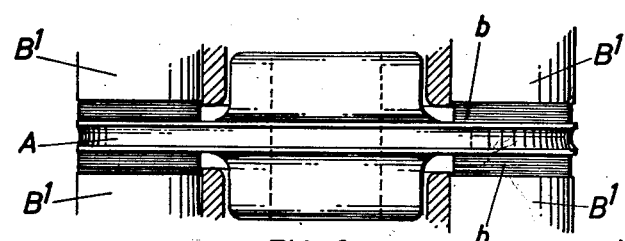
—FIG. 3.—
INVENTOR:
SAMUEL LEE
BY
Norris & Bateman
ATTORNEYS March 10, 1964  S. LEE  3,124,219
DISC BRAKE ASSEMBLY
Filed Jan. 3, 1961  2 Sheets-Sheet 2
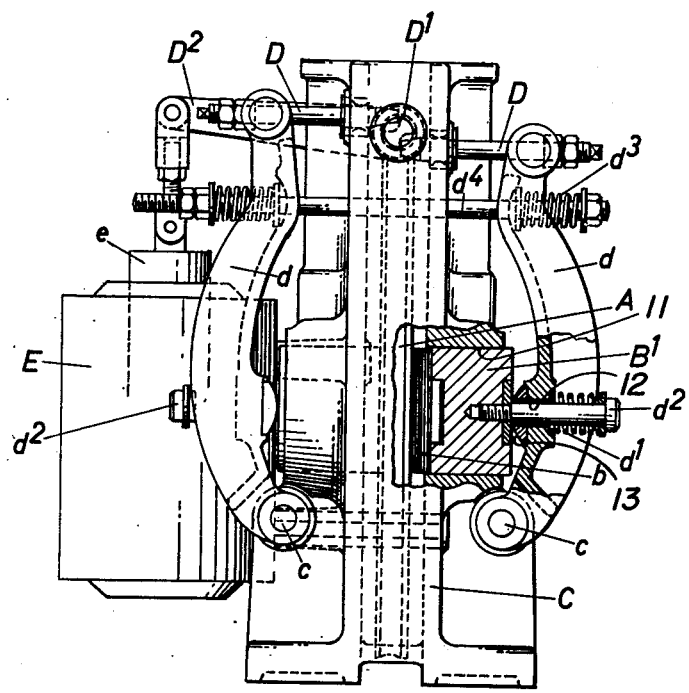
—FIG. 2.—
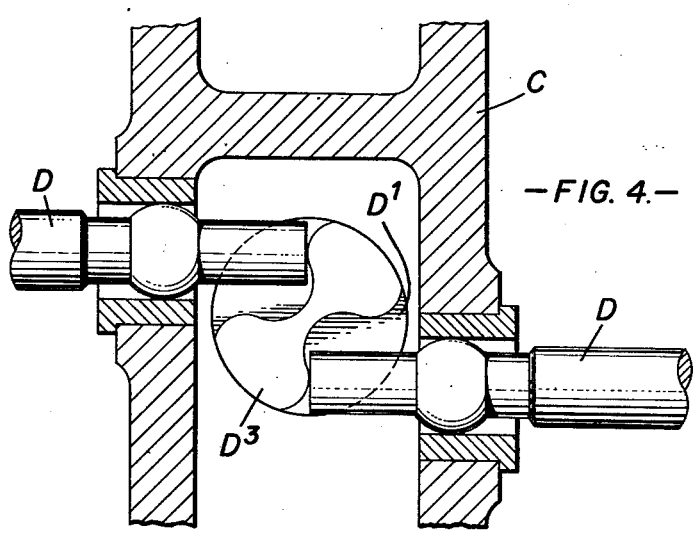
—FIG. 4.—
INVENTOR:
SAMUEL LEE
BY Morris & Bateman
ATTORNEYS 3,124,219
DISC BRAKE ASSEMBLY
Samuel Lee, Manchester, England, assignor to The Vaughan Crane Company Limited, Manchester, England, a body corporate of Great Britain
Filed Jan. 3, 1961, Ser. No. 80,355
1 Claim. (Cl. 188—173)

This invention relates to improvements in disc brakes for cranes.

A brake for an electric motor has been proposed in which the brake is applied by springs acting on pressure plates and is electro magnetically released by the energization of a coil which attracts the pressure plates.

The object of the invention is to provide a disc brake which fails to safety under the action of springs and which is released by an electric solenoid against the action of the springs.

According to the invention the load handled by the crane is transmitted through a brake disc mounted on the driving shaft, the brake pads being carried by pivoted brake arms normally retained in contact with the disc by spring members which are released to allow the load to lift or descend on the energization of an electric solenoid to actuate a cam and which overcomes the spring pressure thereby providing a brake which fails to safety whenever the electricity supply is disconnected.

The invention will be described with reference to the accompanying drawings:

FIG. 1 is an elevation of a disc brake assembly.

FIG. 2 is a side elevation in direction of arrow 2, FIG. 1.

FIG. 3 is a detail view of the disc and co-acting brake pads.

FIGURE 4 is a detail fragmentary view partly in section showing a conventional type cam arrangement for operating the cam follower rods.

A brake disc A is mounted on the driving shaft B engaged by pads $b$ of friction material mounted on pressure plates $B^1$ arranged on each side of the disc. The pressure plates $B^1$ are carried by arms $d$ mounted on pivots $c$ on a frame C. The pressure plates $B^1$ are mounted on rods $d^2$ screwing into the pressure plates and extending through the arms $d$ adjacent the pivots $c$. Springs $d^1$ on the rods $d^2$ allow the pressure plates to rock as the arms $d$ pivot.

Pressure plates $B^1$ as shown in FIGURE 2 are slidably guided in stationary frame bores 11, and rods $d^2$ pass freely through enlarged bores 12 in arms $d$. Pressure plates $B^1$ thus have only direct axial movement relative to the brake disc, but as arms $d$ swing about their pivots $c$ there is relative movement of pressure plates $B^1$ on inner arm arcuate surfaces 13 as permitted by the loose fit of rods $d^2$ in bores 12 to compensate for the differences in movement of the pressure plates and arms $d^2$.

Adjustable rods D are secured to each arm $d$ and extend through the frame C with their free ends engaged by cams $D^3$ mounted on a spindle $D^1$. Cam spindle $D^1$ rotates on an axis (FIGURE 2) that lies in the central plane of the brake disc and radially outside that disc. The spindle $D^1$ is connected to the armature $e$ of an electric solenoid E through a lever $D^2$ the armature on energization of the solenoid rotating the cam shaft $D^1$ and cams $D^3$ to separate the arms $d$ against the action of the springs $d^3$ carried on an adjustable rod $d^4$ and thereby release the pressure of the pads $b$ on the disc A. The disc A is thus freed and rotates to allow the load to descend, the pads $b$ being re-applied to stop the disc A on de-energization of the solenoid E.

By the use of the moulded pads $b$ brake fading is eliminated, and the brake retains its efficiency irrespective of the number of successive operations.

I claim:

A disc brake assembly comprising a relatively stationary frame, a brake disc mounted for rotation about a fixed axis on said frame, two pairs of arms pivoted at adjacent ends on parallel axes perpendicular to said disc axis on the frame on diametrically opposite sides of said brake disc, pressure plates mounted on said arms and having friction surfaces engaging opposite sides of said brake disc in aligned opposed relation, means resiliently biasing said arms to rock about their respective pivots toward each other to apply said friction surfaces to said brake disc sides, two cams, each associated with one of said pairs of arms, a shaft carrying said cams rotatably mounted on said frame, said cams being disposed adjacent the other ends of said arms and rotatable on an axis that lies in the central plane of said disc radially outwardly of said disc and parallel to said arm pivots, a solenoid assembly having a shiftable armature, means connecting said armature to said shaft to rotate said cams upon electrical energization of said solenoid, and cam followers operably extending between said cams and said other ends of said arms whereby energization of said solenoid will rotate the cams to oppositely rock said arms to frictionally disengage said pressure plates from the brake disc and store energy in said resilient biasing means and failure of energization of said solenoid will result in said energized resilient means forcibly applying said pressure plates against the sides of said brake disc.

References Cited in the file of this patent

UNITED STATES PATENTS

| 1,159,238 | Leonard | Nov. 2, 1915 |
| 1,563,544 | Atkinson | Dec. 1, 1925 |
| 2,785,710 | Mowery | Mar. 19, 1957 |
| 2,792,080 | Dunlop | May 14, 1957 |
| 2,949,979 | Carroll | Aug. 23, 1960 |

FOREIGN PATENTS

| 1,037,217 | Germany | Aug. 21, 1958 |
| 1,243,698 | France | Sept. 5, 1960 |